(12) United States Patent
Saruhashi

(10) Patent No.: US 6,848,842 B2
(45) Date of Patent: Feb. 1, 2005

(54) FLOOR-MOUNTED CAMERA DEVICE

(76) Inventor: Nozomu Saruhashi, 26-3, 3-chome, Bessho-cho, Kishiwada-shi, Osaka 596-0045 (JP)

( * ) Notice: Subject to any disclaimer, the term of this patent is extended or adjusted under 35 U.S.C. 154(b) by 0 days.

(21) Appl. No.: 10/258,749
(22) PCT Filed: Feb. 16, 2001
(86) PCT No.: PCT/JP01/01144
§ 371 (c)(1), (2), (4) Date: Jan. 28, 2003
(87) PCT Pub. No.: WO01/84827
PCT Pub. Date: Nov. 8, 2001

(65) Prior Publication Data
US 2003/0161623 A1 Aug. 28, 2003

(30) Foreign Application Priority Data
Apr. 28, 2000 (JP) .......................... 2000-129837

(51) Int. Cl.[7] .................. G03B 17/00; F16M 11/04; H04N 5/225
(52) U.S. Cl. ................. 396/428; 248/176.3; 348/207.1; 348/373
(58) Field of Search .............. 248/685, 176.3; 348/207.1, 373; 396/419, 428, 429

(56) References Cited

U.S. PATENT DOCUMENTS

D377,032 S * 12/1996 Morooka .................. D16/202
5,801,919 A * 9/1998 Griencewic ................ 361/683
5,933,668 A * 8/1999 Hyers ....................... 396/392
6,137,526 A * 10/2000 Kakii ........................ 396/428
6,411,332 B1 * 6/2002 Whitby et al. ............. 348/376
6,437,826 B1 * 8/2002 Arnold ....................... 348/373
6,738,094 B1 * 5/2004 Minami et al. ............. 348/373

FOREIGN PATENT DOCUMENTS

| JP | 64-18882 | 1/1989 |
| JP | 9-154114 | 6/1997 |
| JP | 11-75174 | 3/1999 |
| JP | 2000-32420 | 1/2000 |

* cited by examiner

Primary Examiner—Christopher Mahoney
(74) Attorney, Agent, or Firm—Wenderoth, Lind & Ponack, L.L.P.

(57) ABSTRACT

A stationary camera device comprises a base unit 1 which can rest on a housing of a display device and on a base table which holds the display device, a camera holder 2 attached to the base unit 1, and a camera unit 3 mounted on the extreme end 2a of the camera holder 2. With the base unit 1 resting on the housing or the base table, the camera holder 2 is rotationally movable relative to the base unit 1 at least in a vertical direction X, and the camera unit 3 is rotationally movable relative to the camera holder 2 at least in the vertical direction X.

3 Claims, 19 Drawing Sheets

(a)

(b)

FLOOR-MOUNTED CAMERA DEVICE

TECHNICAL FIELD

The present invention relates to a stationary camera device which can be positioned at an optional position over the screen of a display device such as a television set. In particular, the present invention relates to a stationary camera device suitable for multimedia-oriented educational systems and video conferencing systems each of which integrates a miniature camera, a microphone, a communication device, etc.

BACKGROUND ART

Recently, computer-based educational systems and video conferencing systems have attracted attention.

Such a system is composed of a display device utilizing a television set or the like, a miniature camera, a microphone, a communication device for sending and receiving image data and audio data, etc.

In this case, the miniature camera is placed on a housing of the display device or beside the display device, so as to situate relatively near the line of sight. An image of a user is taken by the miniature camera and, through a communication line, displayed on the screen of the display device of the receiver's system.

For some current notebook PCs and mobile PCs which can establish two-way communication through an Internet connection, a miniature camera is built in the frame of the display screen in an attempt to bring the camera still closer to the user's line of sight.

Nevertheless, a user usually participates in a conversation or enters required information while watching information shown on the display device (in the case of educational systems, information such as questions and answers, an image of the other side, and so on). Accordingly, although the miniature camera is located closer to the display screen of the display device, the user's line of sight is somewhat off from the natural line of sight when seen on the receiver's display device.

The present invention has been made to solve this problem. A primary object of the invention is to provide a stationary camera device which is capable of matching the user's line of sight into the display screen with his line of sight into the camera, or capable of bringing these lines of sight as close as possible, allowing a miniature camera to locate at an optional position over the display screen. A secondary object of the present invention is to provide a stationary camera device which is capable of matching the user's line of sight into the display screen with his line of sight into the camera, or capable of bringing these lines of sight as close as possible, without locating a miniature camera at an optional position over the display screen.

DISCLOSURE OF THE INVENTION

In order to solve the above problem, a stationary camera device corresponding to the present invention comprises a base unit which can rest on a housing of a display device and on a base table which holds the display device, a camera holder attached to the base unit, and a camera unit mounted on an extreme end of the camera holder. With a direction which is parallel to a holding surface of the base table and which is also parallel to a display screen of the display device being defined as lateral direction, and a direction orthogonal to the lateral direction being defined as vertical direction, and with the base unit, which can selectively rest on the housing or the base table, resting along the lateral direction, the camera holder is flexible, and rotationally movable relative to the base unit at least in the vertical direction. The whole part of the camera holder is rotationally movable to the extent that it touches a top or bottom surface of the base unit. The camera unit is rotationally movable relative to the camera holder at least in the vertical direction.

This arrangement permits an optional choice between two forms of use. In the first form of use, where the base unit rests on the housing of the display device, the camera holder is allowed to hang down in order to position the camera unit at the center of the display screen. In the second form of use, where the base unit rests in front of the display device on the base table, the camera holder is allowed to stand upright in order to position the camera unit at the center of the display device. Such a camera holder can be bent to position the camera unit at the center of the display screen without fail, regardless of the shape and screen size of the display device. In addition, the camera holder can be bent in order to adjust the distance to the user. In addition, since the camera holder is rotationally movable to such an extent touches a top or bottom surface of the base unit, this structure protects the camera holder and the cambera unit from damage when the stationary camera device is packed or otherwise handled. Besides, the foldable camera holder permits compact packing, which improves transport efficiency.

With respect to the above arrangement, the camera holder may have an extensible and retractable structure. Such a camera holder can be extended or retracted to position the camera unit at the center of the display screen without fail, regardless of the shape and screen size of the display device.

Next, a stationary camera device of the present invention corresponding to another aspect of the present invention comprises a base unit which can selectively rest on a housing of a display device and on a base table which holds the display device, camera holders which are respectively attached to a left side and a right side of the base unit and positioned along a left side and a right side of a display screen of the display device, and camera units which are respectively mounted on extreme ends of these camera holders. When the base unit rests on the housing or the base table, the two camera units are locatable at such a height that aligns with the line of sight of a person to be shown on the display area of the display device.

The present invention with such features enables generation of an image with a forward line of sight, by synthesizing images from the two camera units which are positioned on the left and the right. To put it another way, it is possible to send a synthesized image as if the camera units were positioned at the center of the screen of the display device. Since these camera units do not actually overlap the display screen and hence do not interfere with indications on the screen of the display device, a user can enjoy a remarkably convenient form of use.

BEST MODE FOR CARRYING OUT THE INVENTION

Embodiments of the present invention are hereinafter described with reference to the drawings.

<Embodiment 1>

Figure 1:
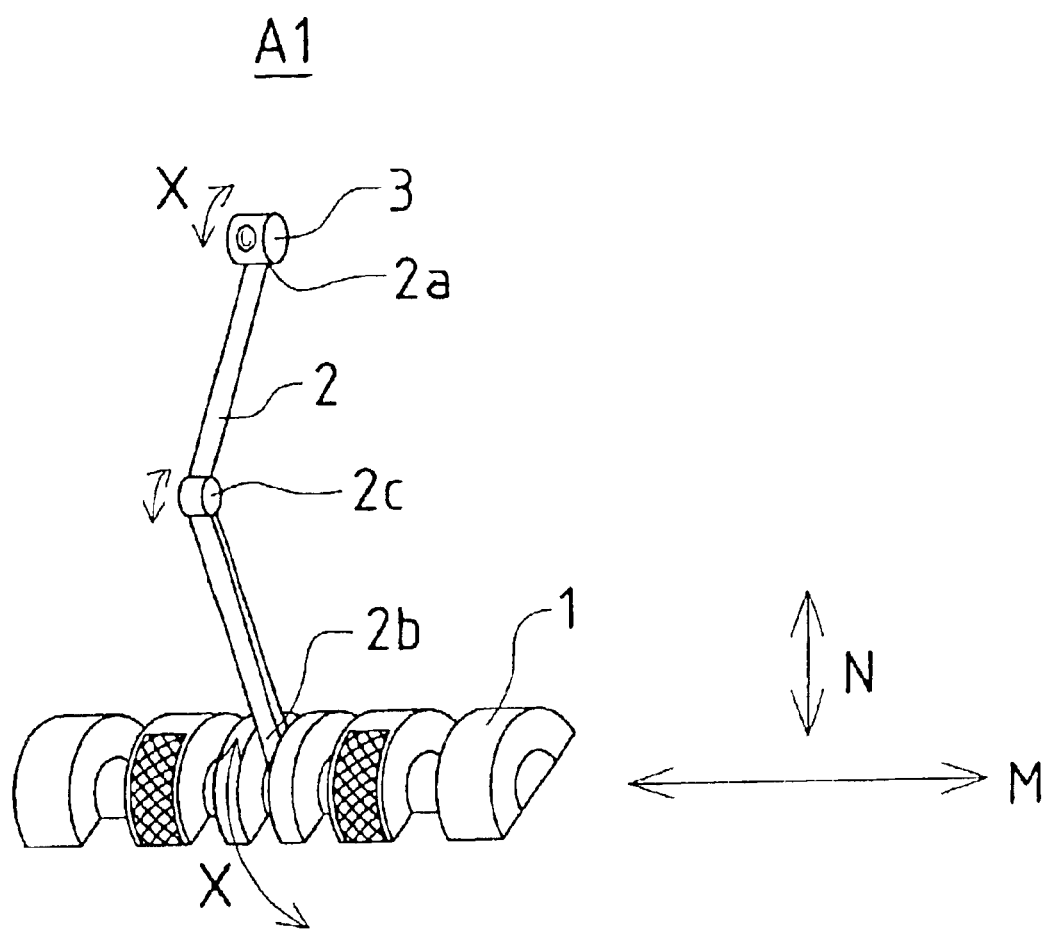
FIG. 1 is a perspective view showing an entire stationary camera device of Embodiment 1 according to the present invention.
Figure 2:
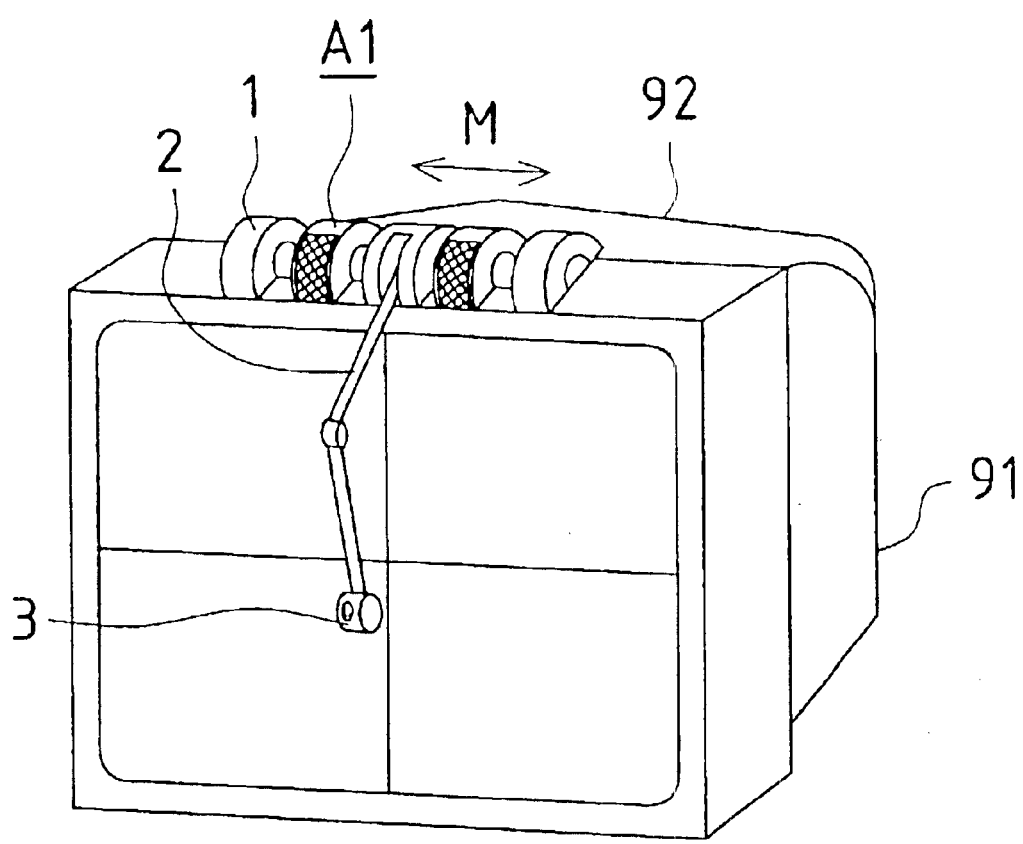
FIG. 2 is a perspective view showing a form of using the stationary camera device of Embodiment 1.
Figure 3:
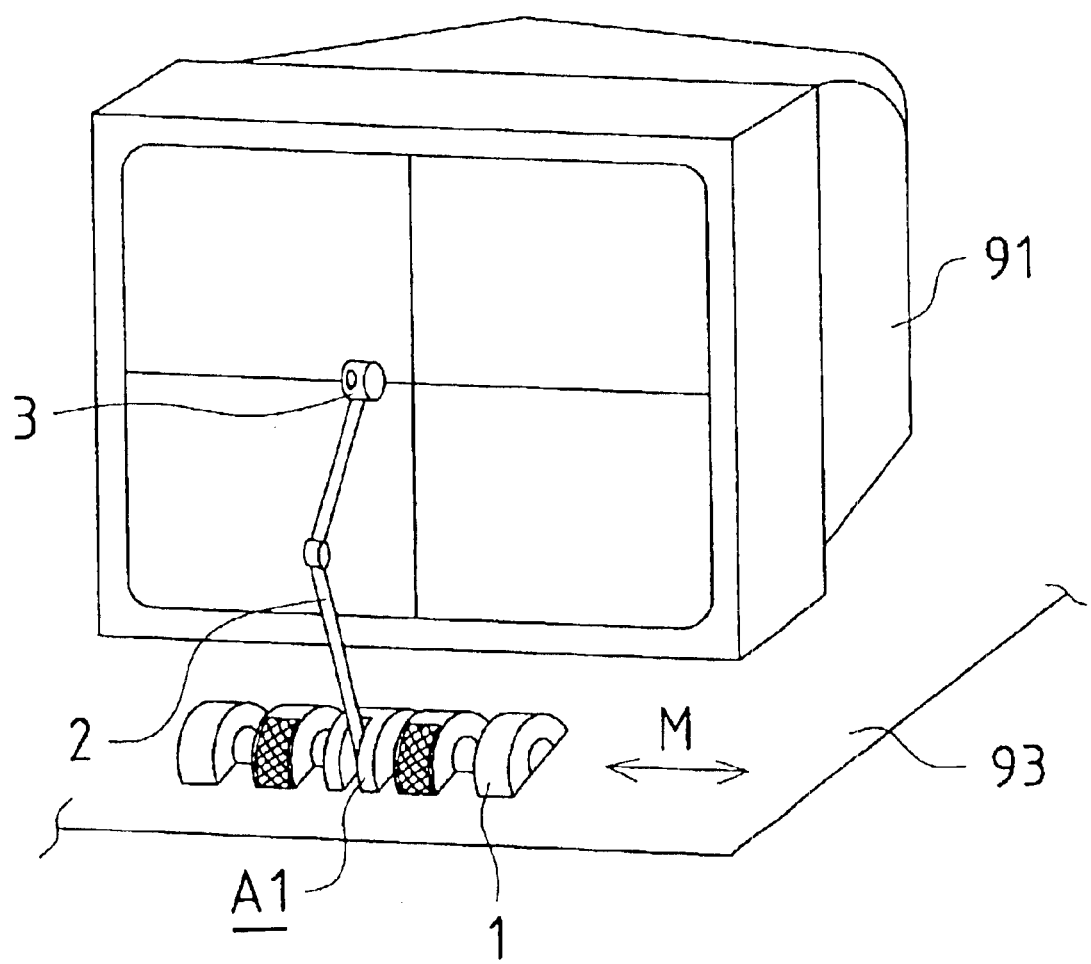
FIG. 3 is a perspective view showing another form of using the stationary camera device of Embodiment 1.

FIG. 1 is a perspective view showing an entire stationary camera device of Embodiment 1 according to the present invention. FIG. 2 and FIG. 3 are perspective views showing forms of using this stationary camera device.

A stationary camera device A1 of Embodiment 1 comprises a base unit 1 which can rest on a housing 92 of a display device 91 (see FIG. 2) or on a base table 93, such as a desk, which holds the display device 91 (see FIG. 3). A camera holder 2 is attached at the middle of the base unit 1, and a camera unit 3 is mounted on the extreme end 2a of the camera holder 2.

The base unit 1 has a laterally elongated shape. In Embodiment 1, the base unit 1 contains a built-in speaker and a connection terminal for connection to a jack of a headset (not shown). The bottom surface of the base unit 1 is a flat surface so as to rest on the housing 92 and the base table 93 in a stable manner. In order to ensure fixed placement of the base unit 1, sticking parts such as suction cups may be provided at more than one position on the bottom surface (e.g. two positions on the left and right, or four positions on the front-left, front-right, back-left and back-right).

Now, a direction which is parallel to the holding surface of the base table 93 and which is also parallel to the display screen of the display device 91 is defined as lateral direction M, while a direction orthogonal to the lateral direction M is defined as vertical direction N. In this situation, the base unit 1 is placed on the housing 92 or the base table 93, basically with its longitudinal direction aligned with the lateral direction M (see FIG. 2 and FIG. 3).

As for the camera holder 2, the basal end 2b is attached to the base unit 1 such that the camera holder 2 can move rotationally in vertical directions (directions of Arrow X in FIG. 1) relative to the base unit 1. The camera holder 2 of Embodiment 1 has a joint 2c in the middle. This joint 2c allows the camera holder 2 to bend in the form of L, also in the X directions.

The camera unit 3 mounted on the extreme end 2a of the camera holder 2 is also rotationally movable in vertical directions (directions of Arrow X in FIG. 1) relative to the extreme end 2a of the camera holder 2.

In order to realize the states of placement shown in FIG. 2 and FIG. 3, the camera holder 2 needs to be rotationally movable relative to the base unit 1, at least in a range of about 180 degrees. Besides, the camera unit 3 needs to be rotationally movable relative to the camera holder 2, in a range of 180 degrees or greater (preferably about 200 degrees).

According to the above arrangement, when the stationary camera device A1 of. Embodiment 1 is placed on the housing 92, it is possible to move the camera holder 2 rotationally into a hanging posture and then bend the joint 2c in a suitable manner in order to adjust the position of the camera unit 3 approximately to the center of the display screen. In this state, the camera unit 3 can be adjusted through rotational movement to face a user at the front. Similarly, when the base unit 1 rests on the base table 93 in front of the display device 91 and lies parallel to the display screen, it is possible to move the camera holder 2 rotationally into a standing posture and then bend the joint 2c in a suitable manner, in order to adjust the position of the camera unit 3 approximately to the center of the display screen. In this state, the camera unit 3 can be adjusted through rotational movement to face a user at the front.

Figure 4:
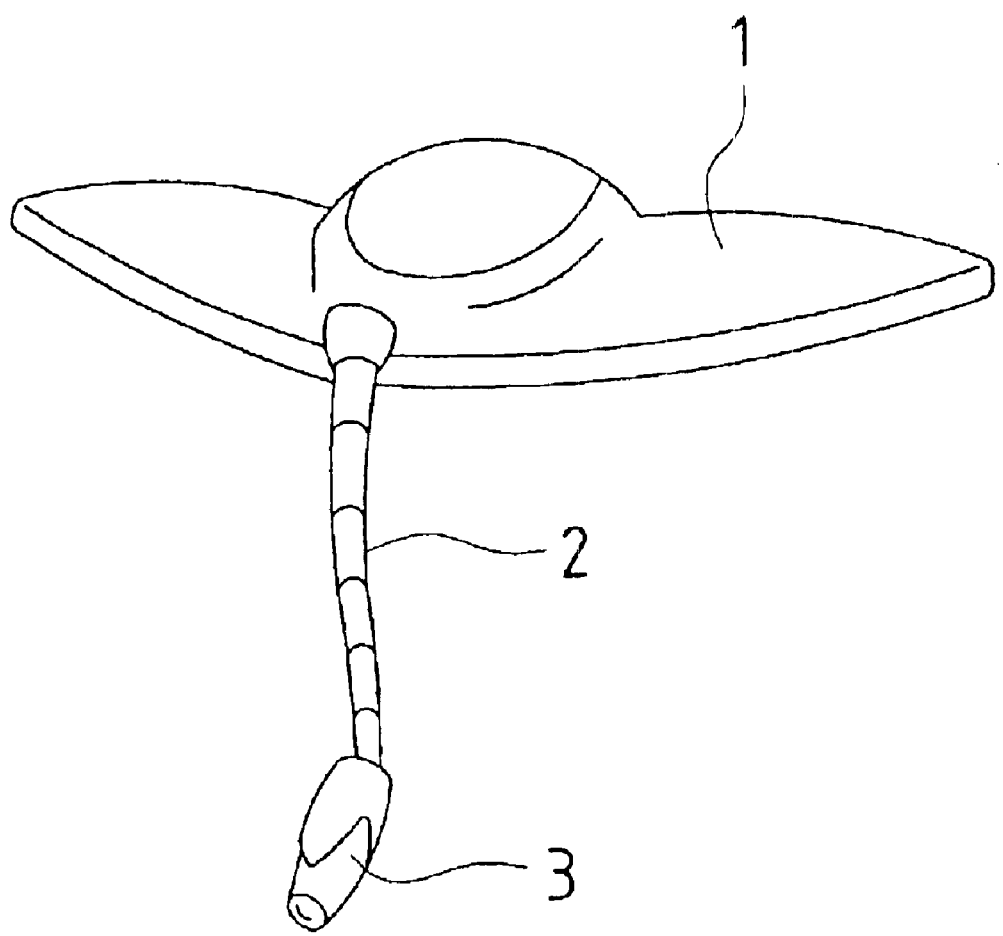
FIG. 4 is a perspective view showing another example of Embodiment 1 as a whole, wherein a camera holder has a different flexible structure.
Figure 5:
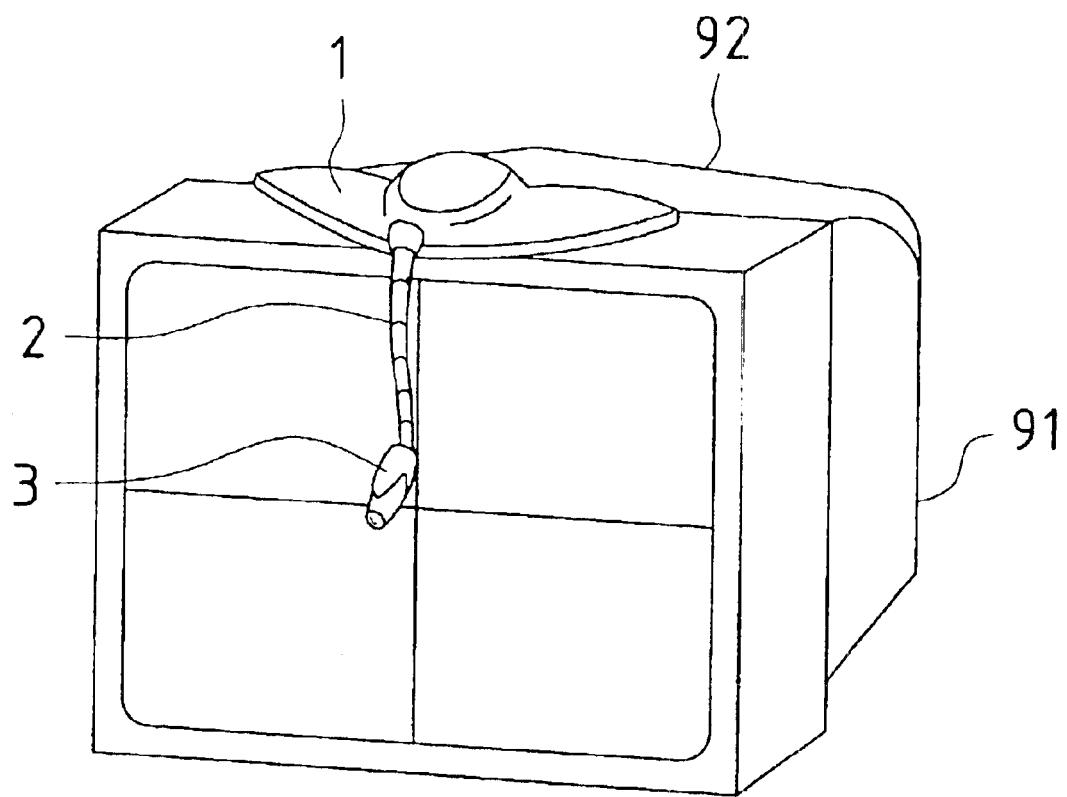
FIG. 5 is a perspective view showing a form of using the stationary camera device illustrated in FIG. 4.
Figure 6:
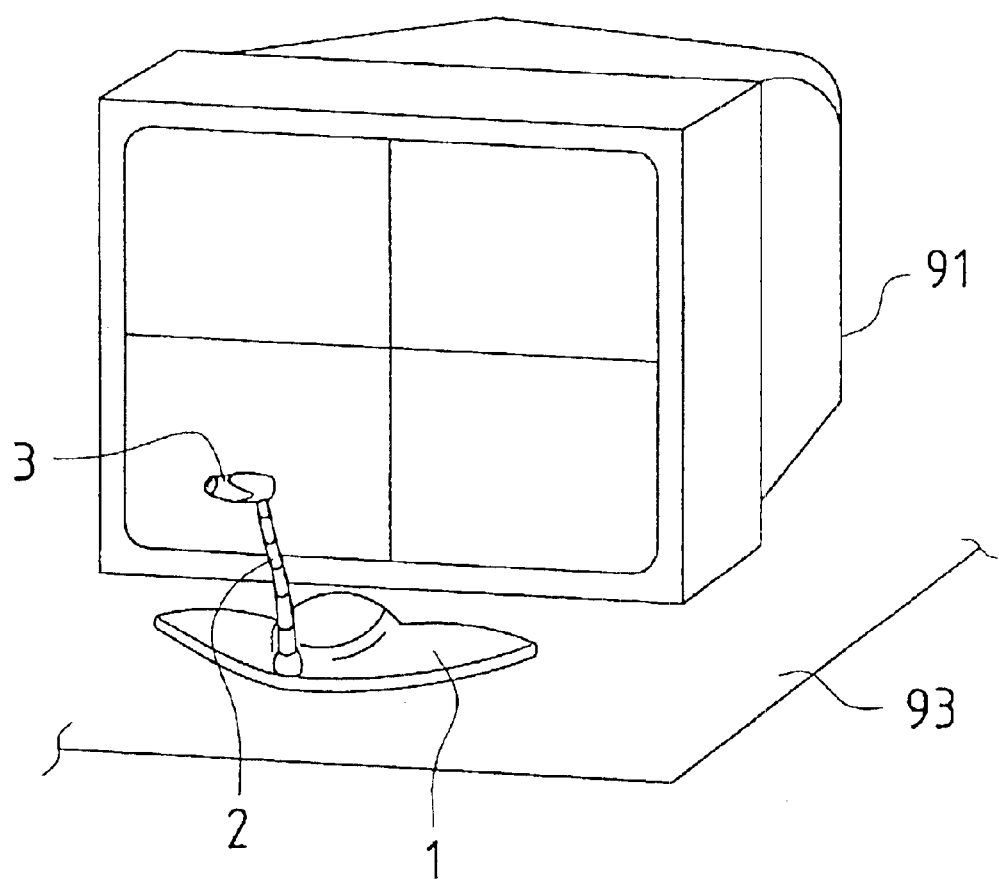
FIG. 6 is a perspective view showing another form of using the stationary camera device illustrated in FIG. 4.

Turning to an example shown in FIG. 4, the camera holder 2 of Embodiment 1 adopts a different flexible structure. The structure of this example allows the whole part of the camera holder 2 to bend optionally. Since this structure is conventionally known and applied, for example, to an arm of a fluorescent desk lamp, detailed description is omitted herein. By making the whole part of the camera holder 2 freely flexible, it becomes easier to adjust the position of the camera unit 3 approximately to the center of the display screen of the display device 91 when the base unit 1 rests on the housing 92 as shown in FIG. 5 or on the base table 93 in front of the display device 91 as shown in FIG. 6.

<Embodiment 2>

Figure 7:
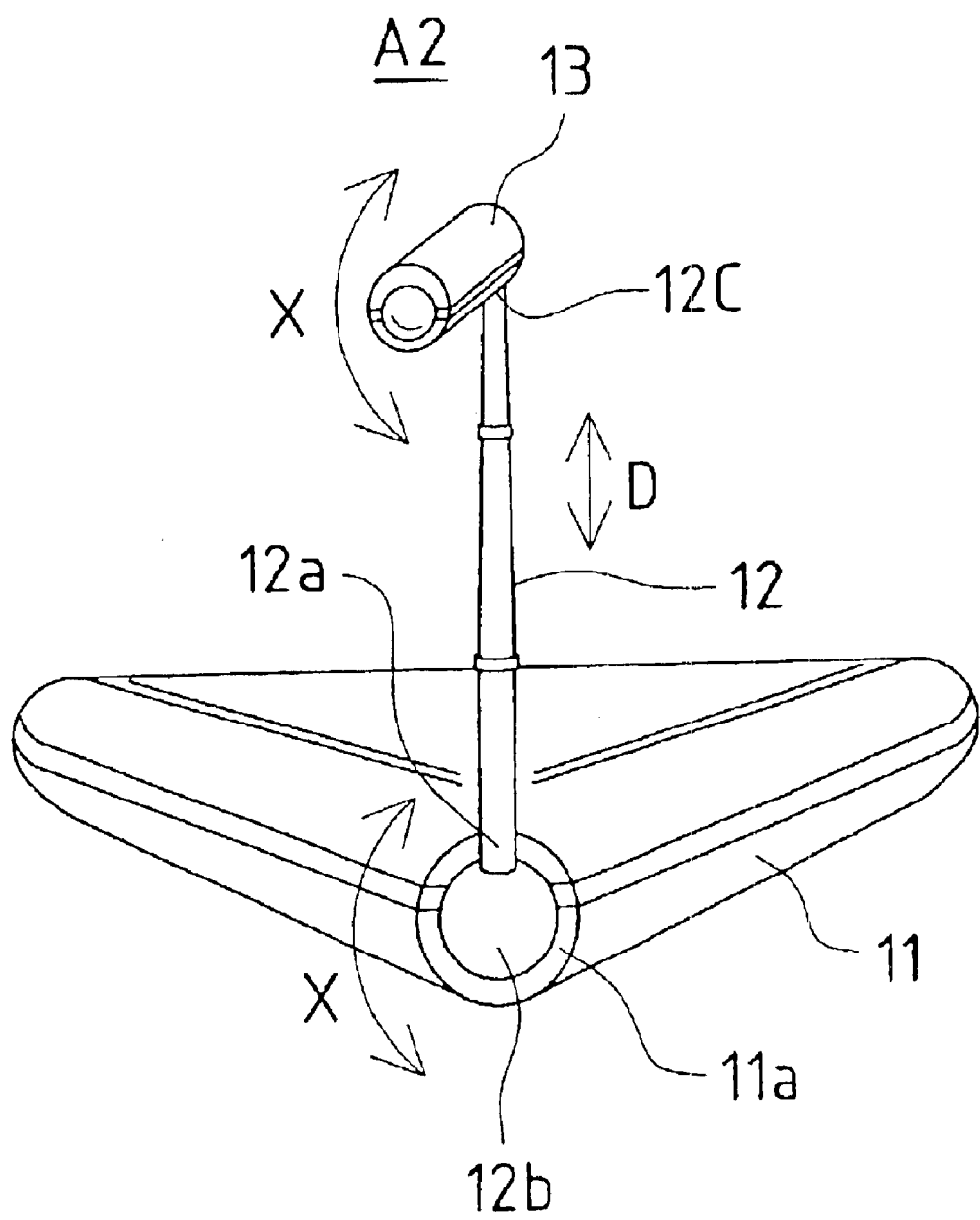
FIG. 7 is a perspective view showing an entire stationary camera device of Embodiment 2 according to the present invention.
Figure 8:
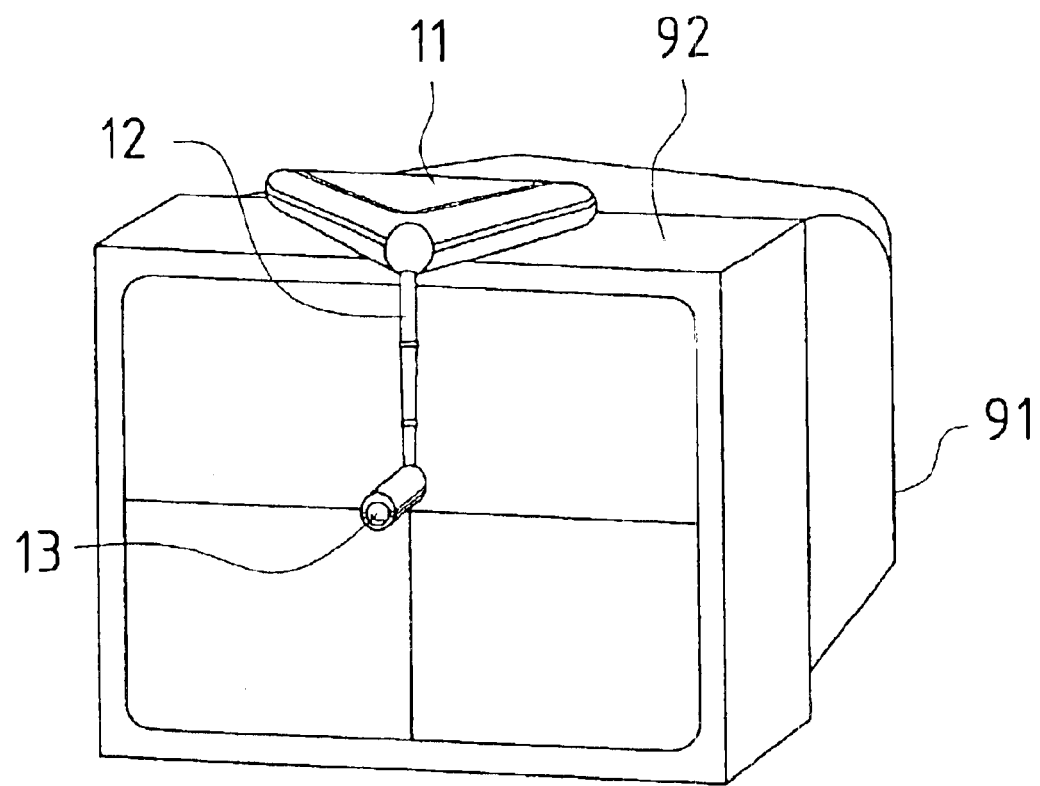
FIG. 8 is a perspective view showing a form of using the stationary camera device of Embodiment 2.
Figure 9:
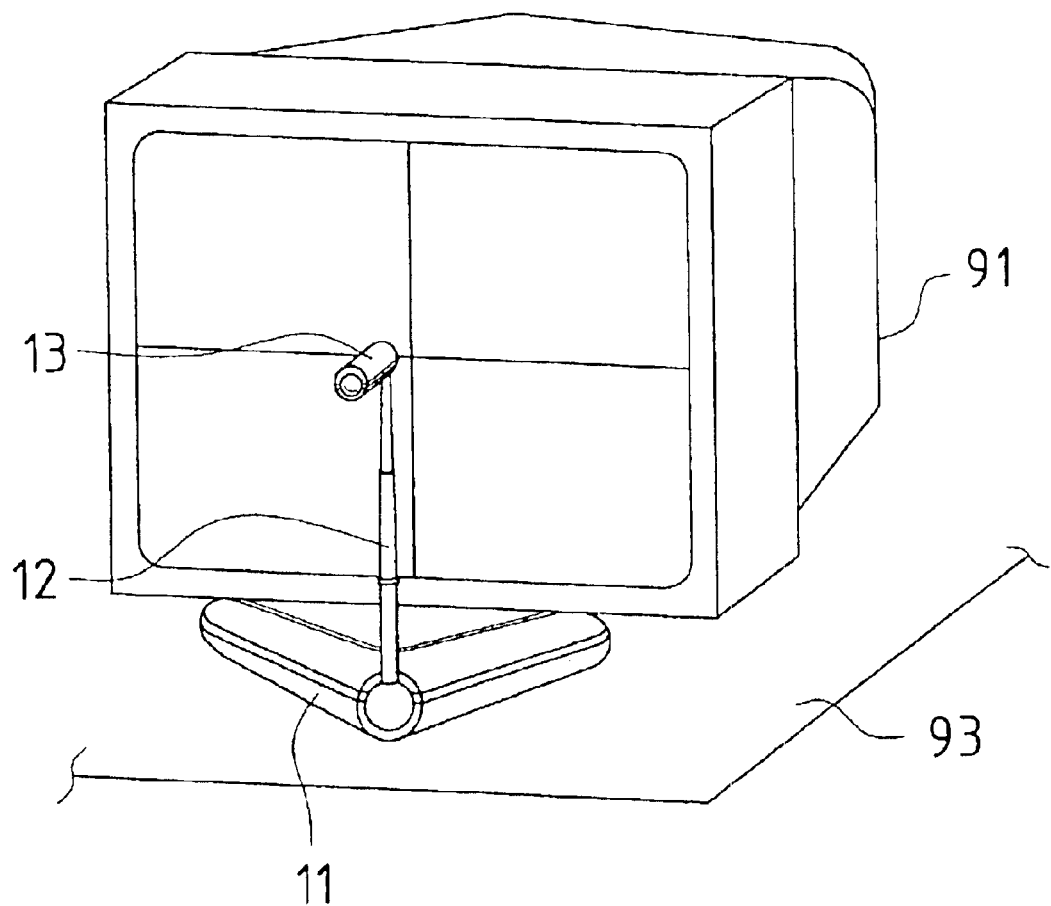
FIG. 9 is a perspective view showing another form of using the stationary camera device of Embodiment 2.

FIG. 7 is a perspective view showing an entire stationary camera device of Embodiment 2 according to the present invention. FIG. 8 and FIG. 9 are perspective views showing forms of using this stationary camera device.

Similar to the stationary camera device A1 of Embodiment 1, the stationary camera device A2 comprises a base unit 11, a camera holder 12, and a camera unit 13. However, the shape of the base unit 11 is designed in consideration of esthetic aspects.

Regarding the difference from Embodiment 1, the camera holder 2 of Embodiment 1 is flexible, whereas the camera holder 12 of Embodiment 2 is extensible and retractable (as indicated by Arrow D in FIG. 7). The other arrangements are the same as those of Embodiment 1. For example, the camera holder 12 is rotationally movable relative to the base unit 11 in the directions of Arrow X, and the camera unit 13 is rotationally movable relative to the camera holder 12 in the directions of Arrow X.

In the stationary camera device A2 of Embodiment 2, however, the basal end 12a of the camera holder 12 is constituted with a ball-like rotating member 12b. The rotating member 12b is fitted in a dented receiver 11a formed in the base unit 11 and held therein in a rotationally movable manner. Therefore, the camera holder 12 is rotationally movable in the single directions indicated by Arrow X in the drawing, and further capable of rotating in a range which is restricted in accordance with the shape of the dented receiver 11a. Although illustration is omitted, the extreme end 12c of the camera holder 12 may be likewise equipped with a ball-like rotating member, and the camera body 13 may be provided with a dented receiver in which the rotating member is fitted. Then, the camera body 13 becomes rotationally movable not only in the single directions indicated by Arrow X in the drawing, but also in three spatial directions (i.e. it becomes rotationally movable over a hemispheric surface) in a range which is restricted in accordance with the shape of the dented receiver.

Incidentally, the extensible/retractable structure of the camera holder 12 can be constructed with a structure similar to an antenna of a radio or the like, a tripod of a camera, a pointer for pointing at the blackboard, and so on.

According to the above arrangement, when the stationary camera device A2 of Embodiment 2 is placed on the housing 92, it is possible to move the camera holder 12 rotationally into a hanging posture and then extend or retract the camera holder 12 in a suitable manner in order to adjust the position of the camera unit 13 approximately to the center of the display screen. In this state, the camera unit 13 can be adjusted through rotational movement to face a user at the front (see FIG. 8). Similarly, when the base unit 11 rests on the base table 93 in front of the display device 91 and lies parallel to the display screen, it is possible to move the camera holder 12 rotationally into a standing posture and then extend or retract the camera holder 12 in a suitable manner in order to adjust the position of the camera unit 13 approximately to the center of the display screen. In this state, the camera unit 13 can be adjusted through rotational movement to face a user at the front (see FIG. 9).

<Embodiment 3>

Figure 10:
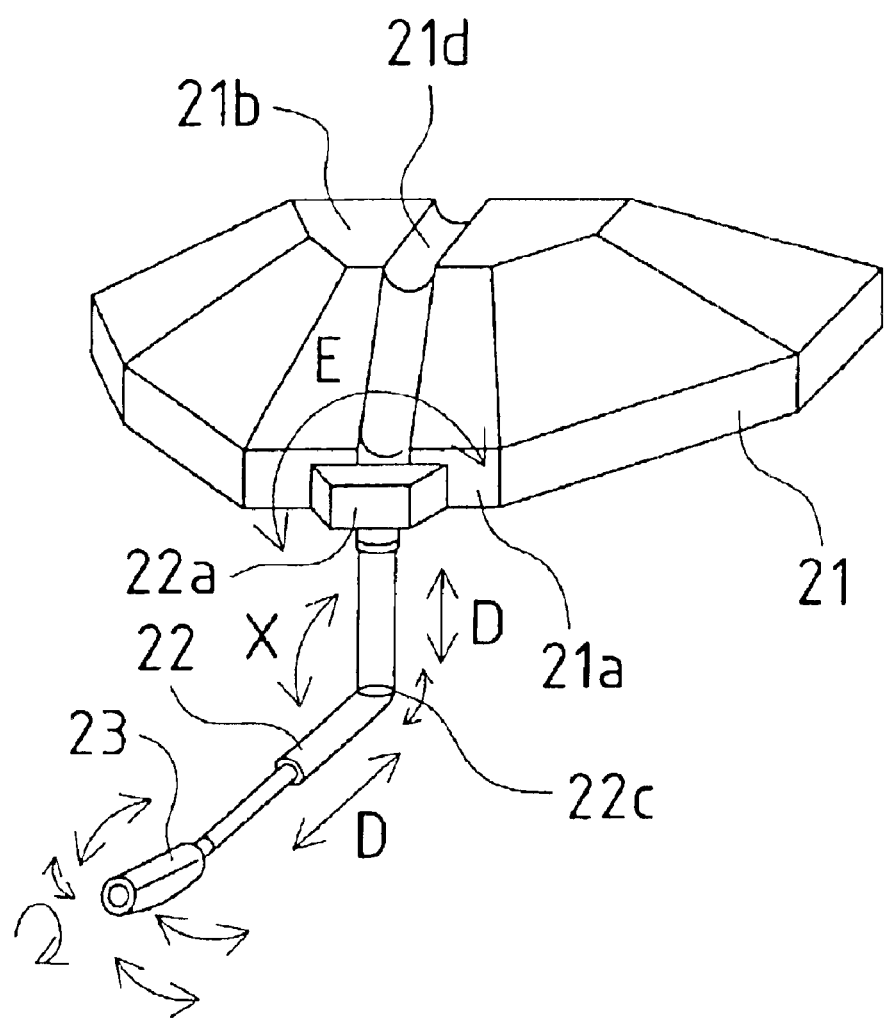
FIG. 10 is a perspective view showing an entire stationary camera device of Embodiment 3 according to the present invention.
Figure 11:
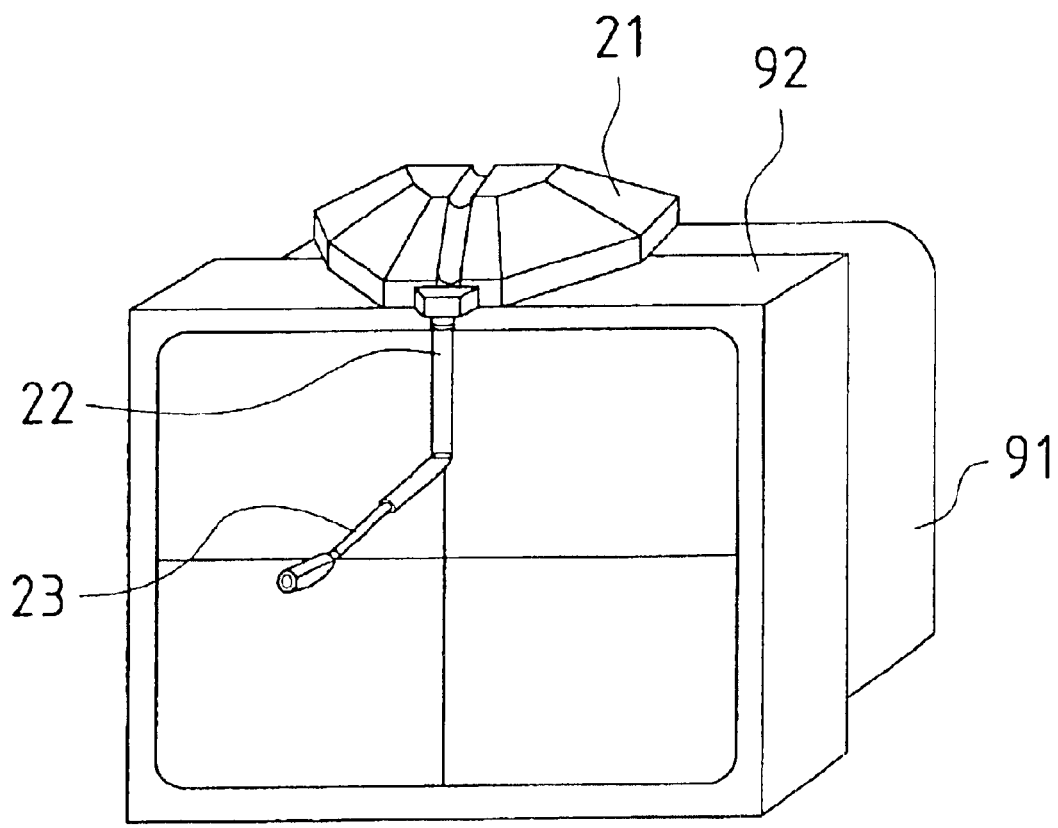
FIG. 11 is a perspective view showing a form of using the stationary camera device of Embodiment 3.
Figure 12:
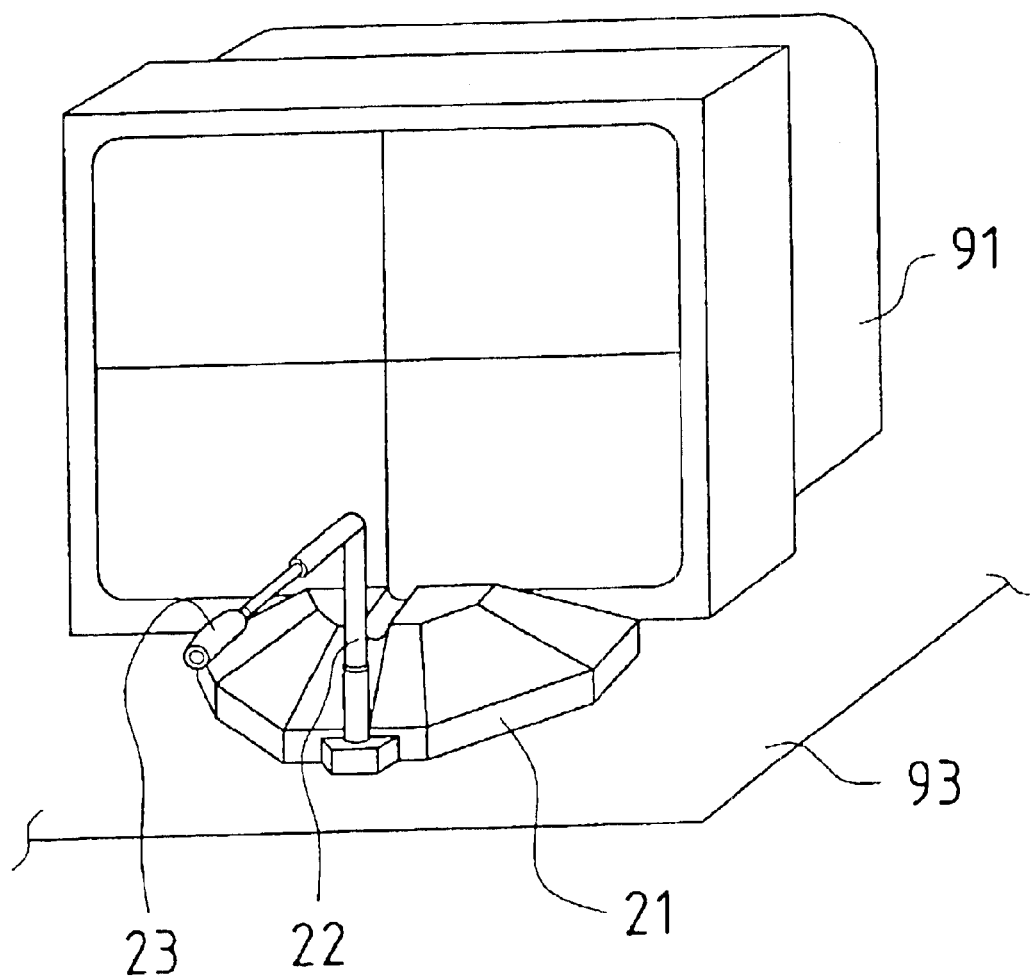
FIG. 12 is a perspective view showing another form of using the stationary camera device of Embodiment 3.

FIG. 10 is a perspective view showing an entire stationary camera device of Embodiment 3 according to the present invention. FIG. 11 and FIG. 12 are perspective views showing forms of using this stationary camera device.

Similar to the stationary camera device A2 of Embodiment 2, the stationary camera device A3 comprises a base unit 21, a camera holder 22, and a camera unit 23. However, the shape of the base unit 21 is designed in consideration of esthetic aspects.

Regarding the difference from Embodiment 2, the camera holder 12 of Embodiment 2 is merely extensible and retractable, whereas the camera holder 22 of Embodiment 3 is flexible (as indicated by Arrow X in FIG. 10) as well as extensible and retractable (as indicated by Arrow D in FIG. 10). The other arrangements are the same as those of Embodiment 2. For example, the camera holder 22 is rotationally movable relative to the base unit 21, and the camera unit 23 is not only rotatable relative to the camera holder 22 but also rotationally movable in three spatial directions (i.e. rotationally movable over a hemispheric surface).

In the stationary camera device A3 of Embodiment 3, however, the basal end 22a of the camera holder 22 projects from the front surface 21a of the base unit 21. As a result, the basal end 22a is allowed to rotate, in a sliding manner, along the front surface 21a of the base unit 21 (as indicated by Arrow E in FIG. 10). In other words, 180-degree rotation of the basal end 22a enables both the use on the housing 92 (see FIG. 11) and the use on the base table 93 in front of the display device 91 (see FIG. 12).

Figure 13:
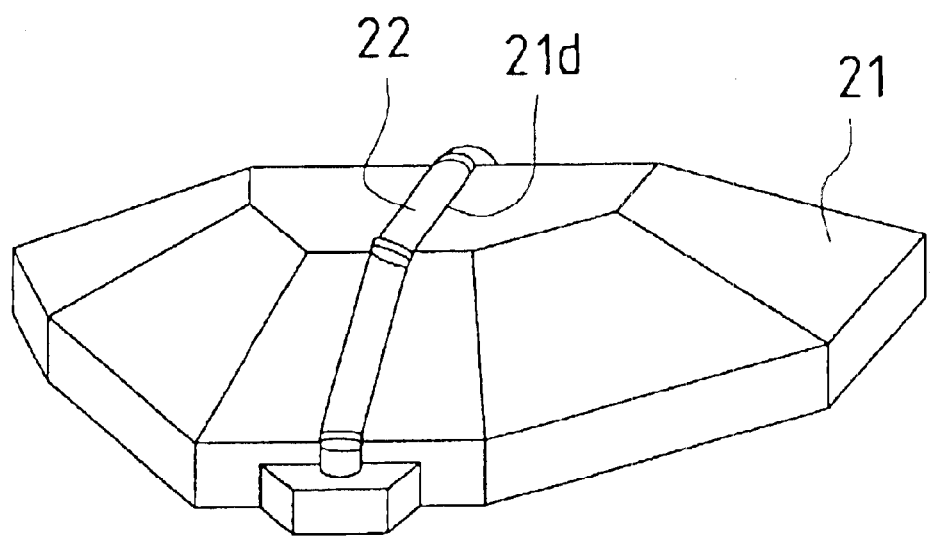
FIG. 13(a) is a perspective view showing the stationary camera device of Embodiment 3 in a folded state.
FIG. 13(b) is a schematic section thereof.
Figure 13:
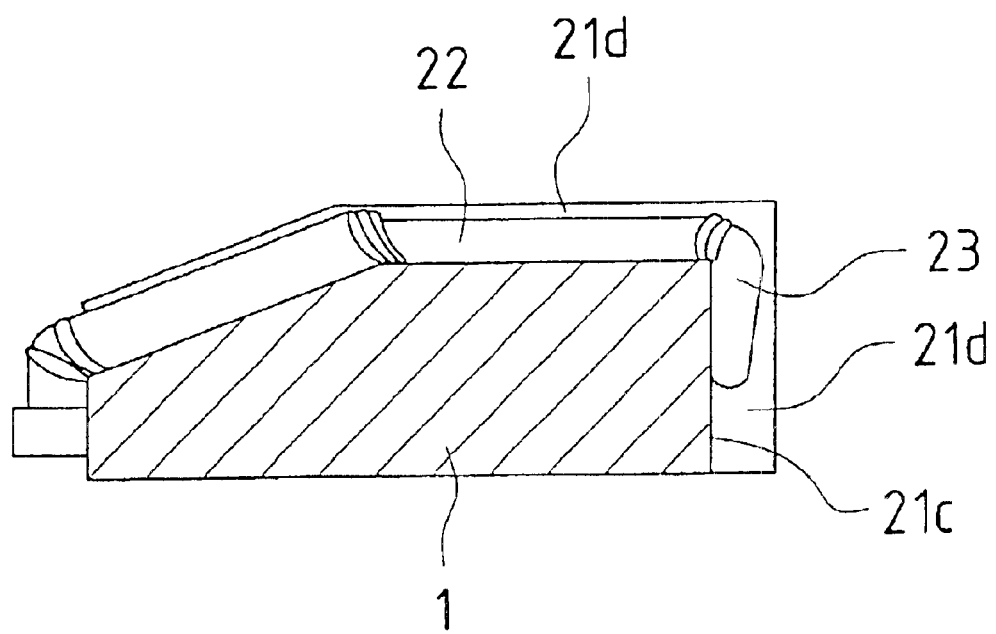

Moreover, for the purpose of storing the camera holder 22 and the camera unit 23, the stationary camera device A3 of Embodiment 3 has a groove-like storage portion 21d which extends from the top surface 21b of the base unit 21 to its rear surface 21c (see also FIG. 13(b)). When not in use, the camera holder 22 and the camera unit 23 can be stored in the storage portion 21d. FIG. 13(a) and FIG. 13(b) illustrate the state where the camera holder 22 and the camera unit 23 are accommodated in the storage portion 21d. If the camera holder 22 and the camera unit 23 are stored in tight contact with the base unit 21, when not in use, the camera holder 22 and the camera unit 23 neither stay in the way nor suffer from damage. Further, there is another advantage in storing the camera holder 22 and the camera unit 23 in tight contact with the base unit 21. By way of example, after production, this stationary camera device A3 can be packed compactly for shipping, which improves transport efficiency. Incidentally, the storage portion 21d for storing the camera holder 22 and the camera unit 23 can be also provided in the stationary camera devices A1 and A2 of Embodiment 1 and Embodiment 2 above.

According to the above arrangement, when the stationary camera device A3 of Embodiment 3 is placed on the housing 92, it is possible to move the camera holder 22 rotationally into a hanging posture and then extend or retract the camera holder 22 up and down in order to adjust the position of the camera unit 23 approximately to the center of the display screen. In this state, it is further possible to extend or retract the camera holder 22 back and forth in order to adjust the distance to a user. Lastly, the camera unit 23 can be adjusted to face a user at the front (see FIG. 11). Similarly, when the base unit 21 rests on the base table 93 in front of the display device 91 and lies parallel to the display screen, it is possible to move the camera holder 22 rotationally into a standing posture and then extend or retract the camera holder 22 up and down, in order to adjust the position of the camera unit 23 approximately to the center of the display screen. In this state, it is further possible to extend or retract the camera holder 22 back and forth in order to adjust the distance to a user. Lastly, the camera unit 23 can be adjusted to face a user at the front (see FIG. 12).

<Embodiment 4>

Figure 14:
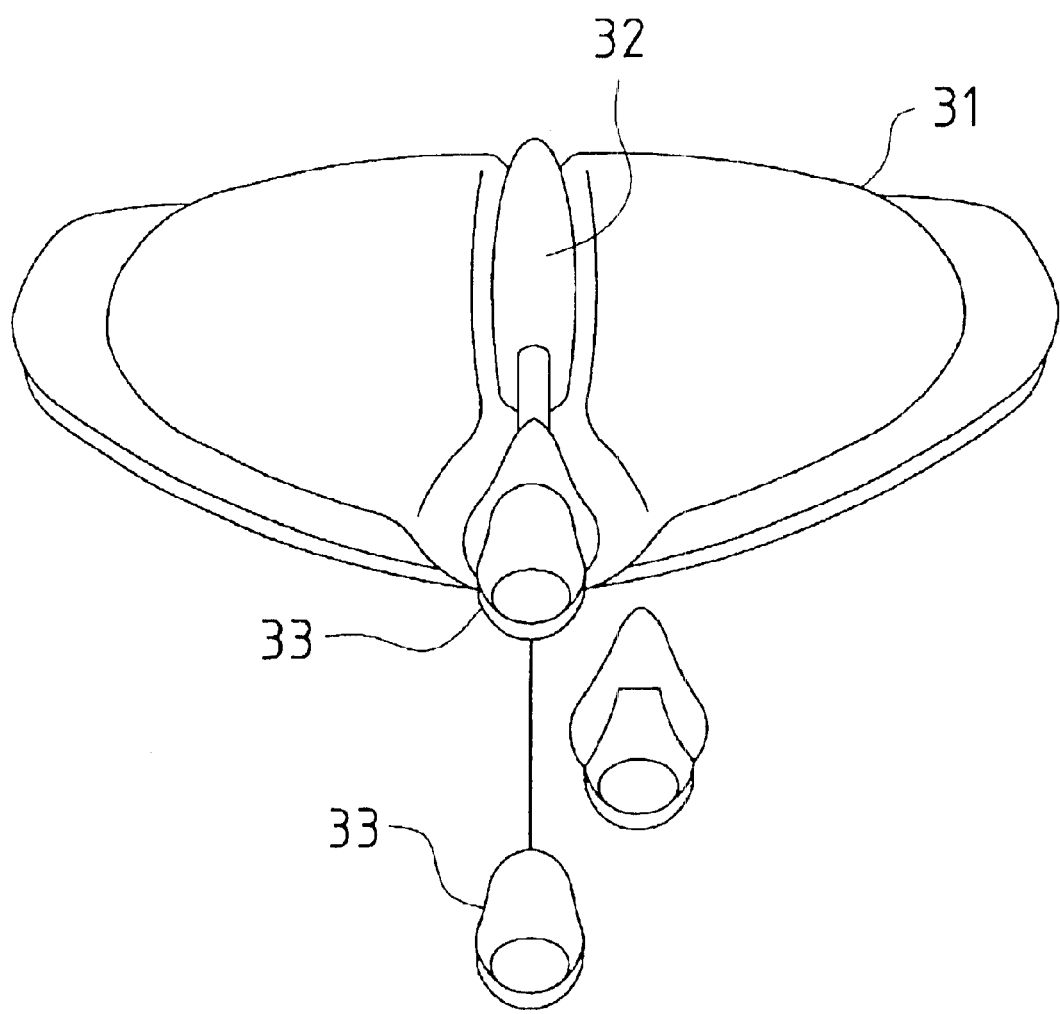
FIG. 14 is a perspective view showing an entire stationary camera device of Embodiment 4 according to the present invention.
Figure 15:
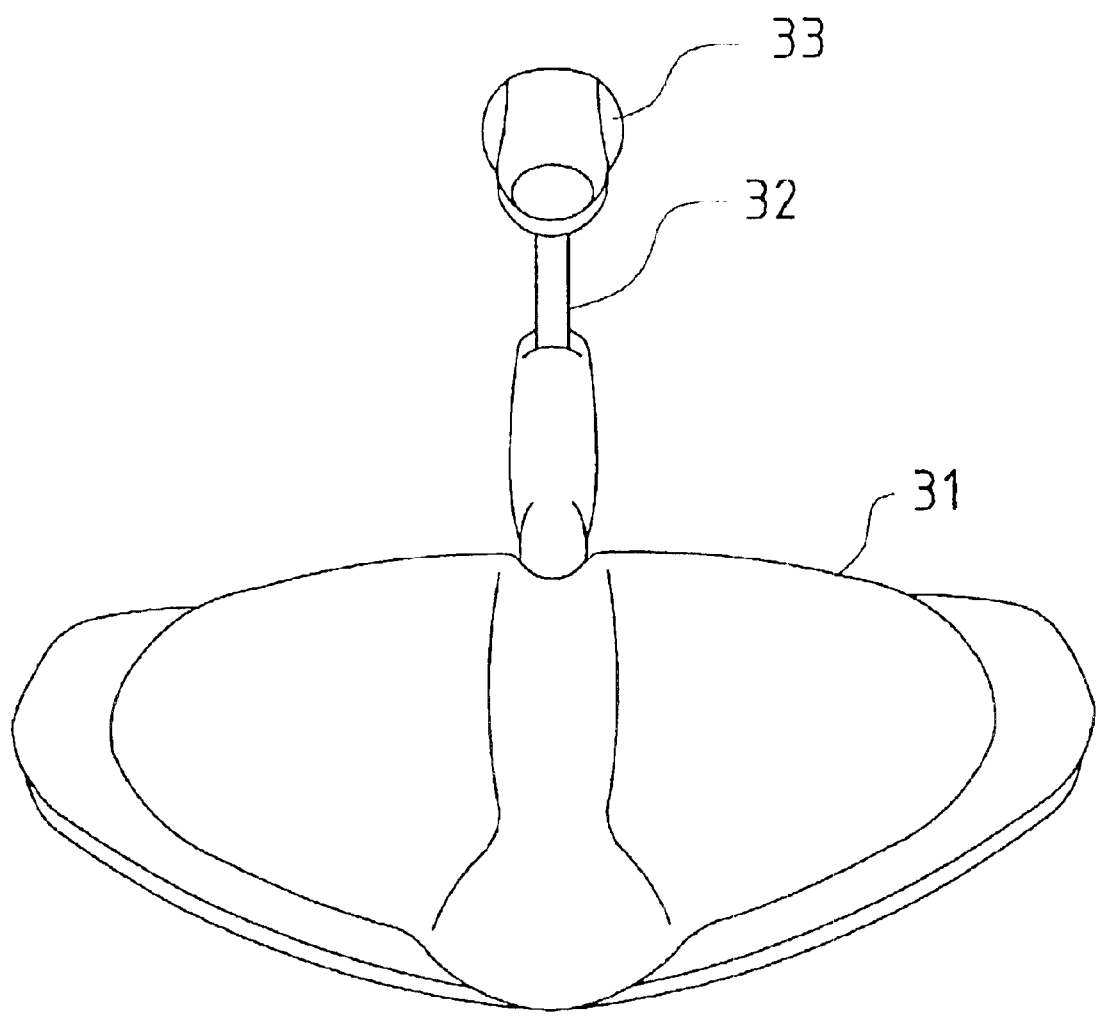
FIG. 15 is another perspective view showing the entire stationary camera device of Embodiment 4 according to the present invention.
Figure 16:
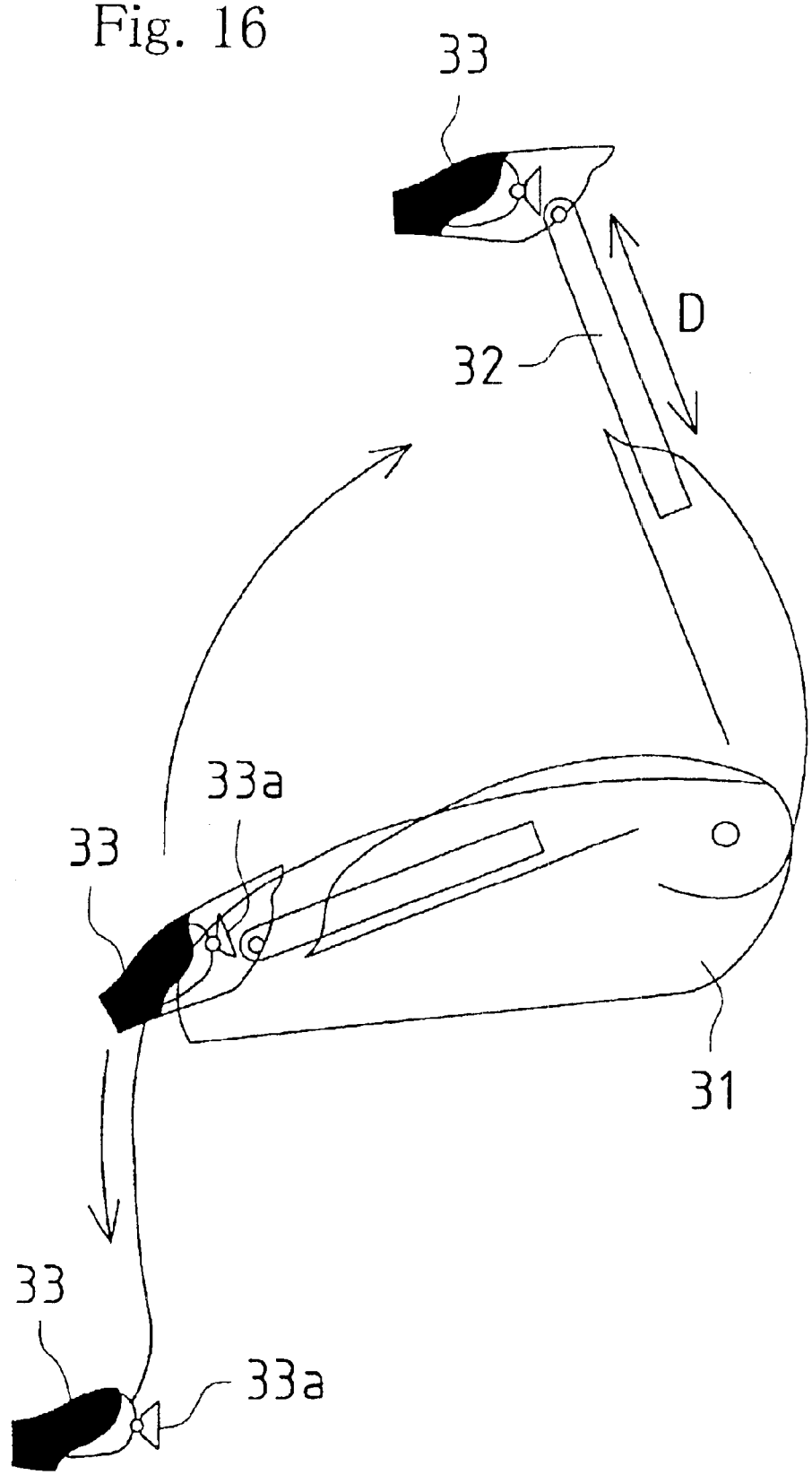
FIG. 16 is a schematic side view showing the stationary camera device of Embodiment 4.

FIG. 14 and FIG. 15 are perspective views showing an entire stationary camera device of Embodiment 4 according to the present invention. FIG. 16 is a schematic side view showing this stationary camera device.

Similar to the stationary camera device A2 of Embodiment 2, the basic arrangement of the stationary camera device A4 is to make the camera holder 32 extensible and retractable (as indicated by Arrow D in FIG. 16). In contrast to Embodiment 2, however, Embodiment 4 allows the camera unit 33 to be pulled out of the camera holder 32. For this arrangement, the camera unit 33 is equipped with a suction cup 33a at the rear side (see FIG. 16). The suction cup can stick to the display screen of the display device (not shown) and thus ensure fixed placement.

To be specific, if the stationary camera device A4 is placed for use on the housing of the display device, the camera unit 33 can be pulled down from the camera holder 32 (the state shown in FIG. 14) to the center of the display screen of the display device. Then, via the suction cup 33a, the camera unit 33 can fixedly stick to the center of the display screen. On the other hand, if the stationary camera device A4 is placed for use in front of the display device (not shown), the camera holder 32 can be first lifted up backwardly (the state shown in FIG. 15) and then pulled out in a suitable manner, so as to adjust its position to the center of the display screen of the display device.

Concerning this embodiment, FIG. 16 should be understood to depict two forms of using the stationary camera device A4 in a single drawing, namely, as placed on the housing of the display device and as placed on the base table in front of the display device.

<Embodiment 5>

Figure 17:
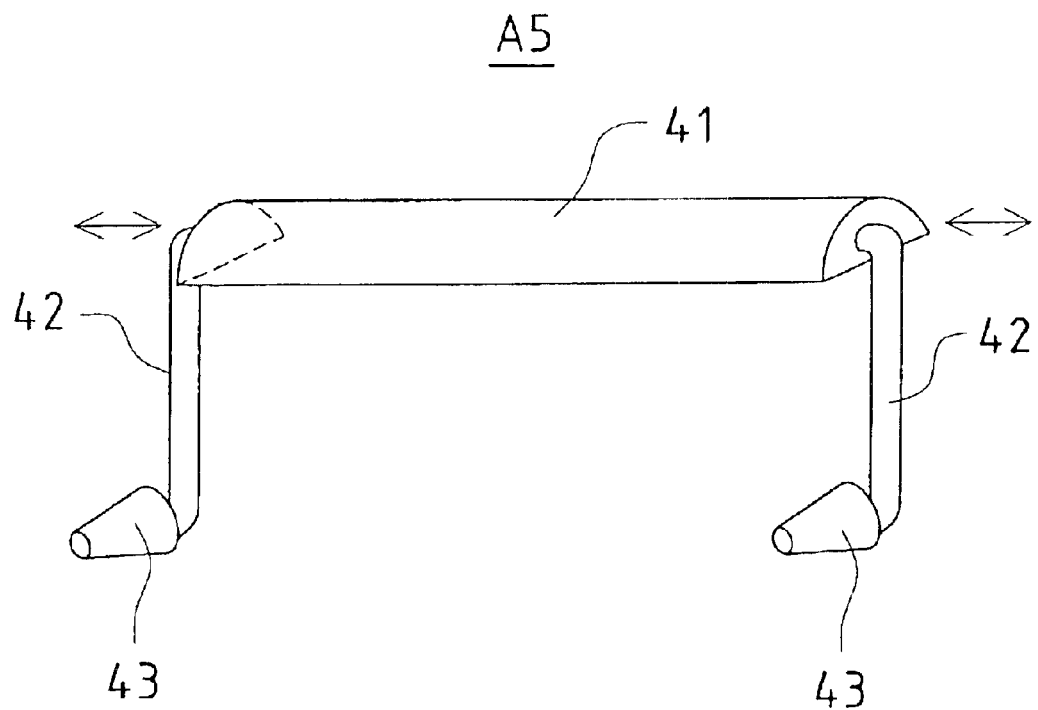
FIG. 17 is a perspective view showing an entire stationary camera device of Embodiment 5 according to the present invention.
Figure 18:
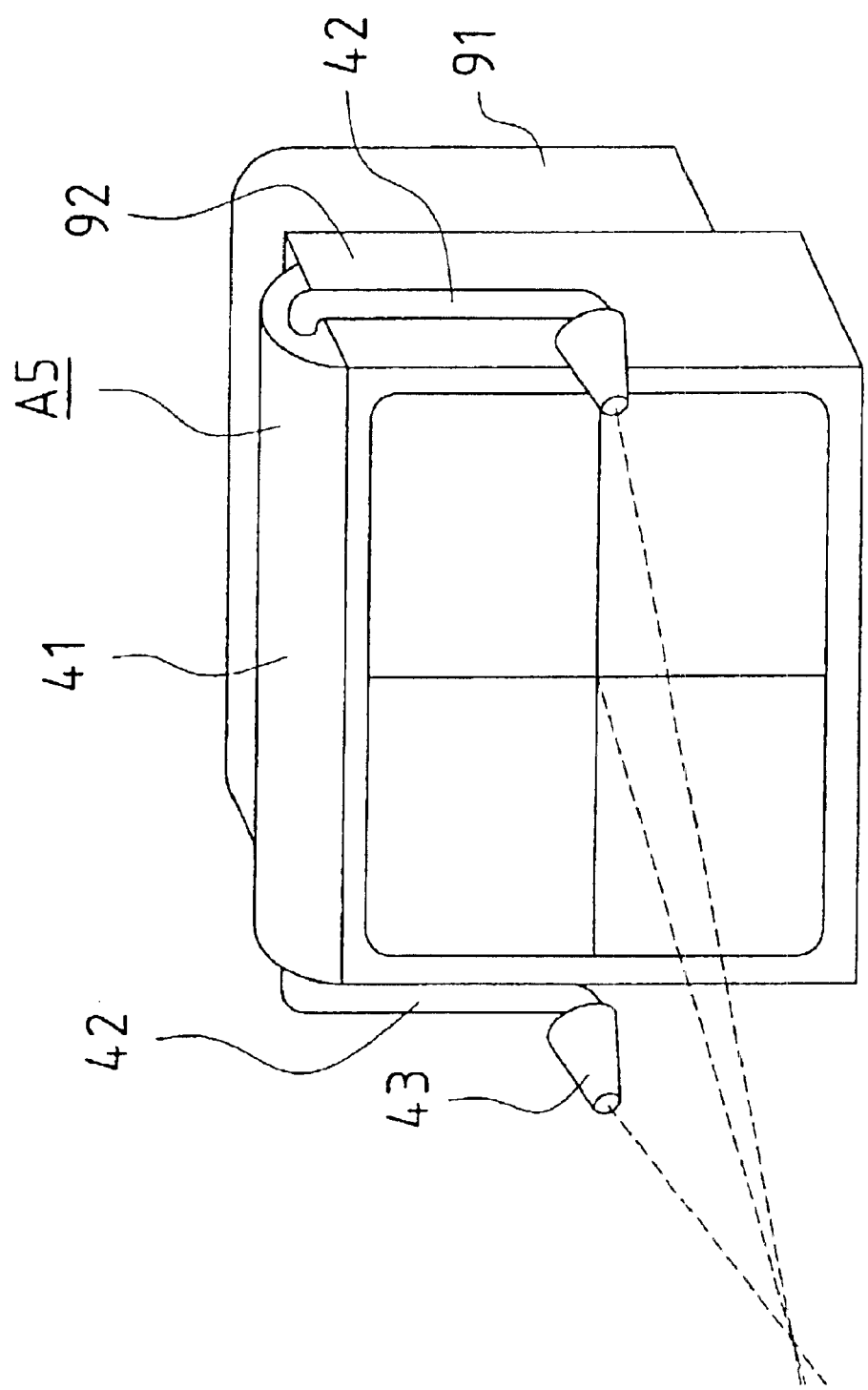
FIG. 18 is a perspective view showing a form of using the stationary camera device of Embodiment 5.
Figure 19:
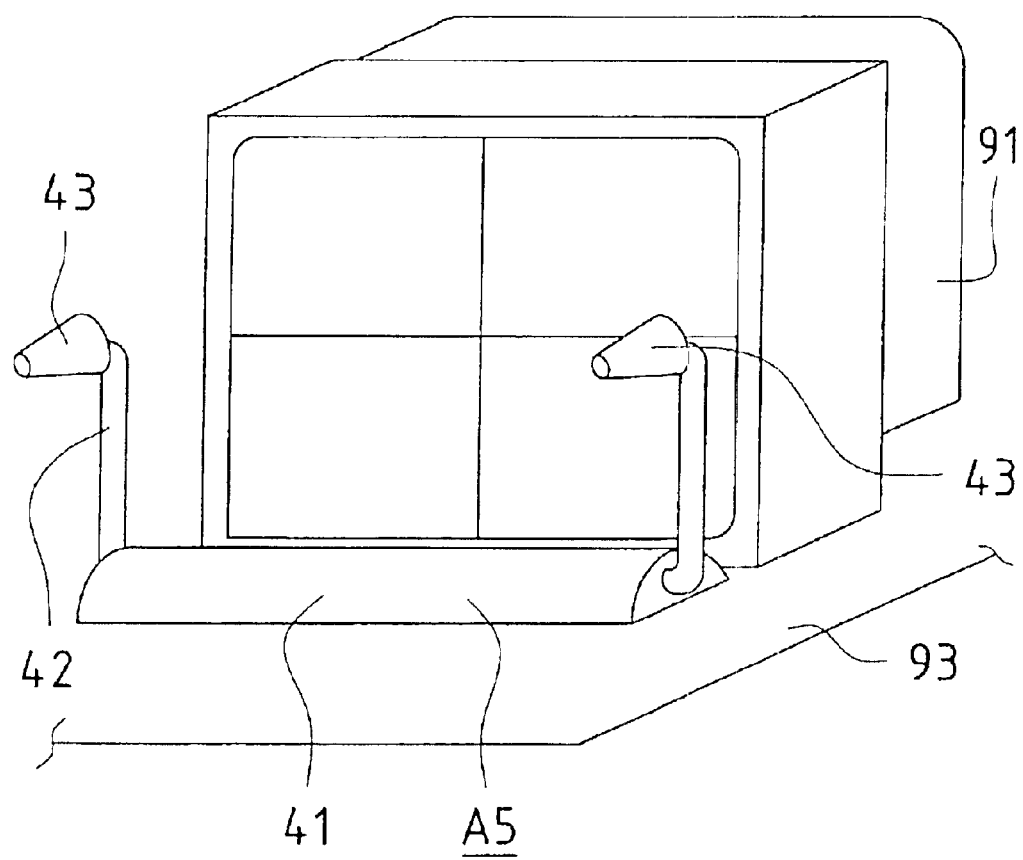
FIG. 19 is a perspective view showing another form of using the stationary camera device of Embodiment 5.

FIG. 17 is a perspective view showing a stationary camera device of Embodiment 5 according to the present invention. FIG. 18 and FIG. 19 are perspective views showing forms of using this stationary camera device.

A stationary camera device A5 of Embodiment 5 comprises a base unit 41 which can rest on a housing 92 of a display device 91 and on a base table 93 which holds the display device 91, camera holders 42, 42 which are respectively attached to the left and right sides of the base unit 41 and positioned along the left and right sides of the display screen of the display device 91, and camera units 43, 43 which are respectively mounted on the extreme ends of the camera holders 42, 42. The length (the lateral width) of the base unit 41 is nearly equal to the lateral width of the housing 92 of the display device 91. When the base unit 41 is placed on the housing 92 or the base table 93, the two camera units 43, 43 are locatable at a height that aligns with the line of sight of a person to be shown on the display screen of the display device 91 (to be specific, at the height which approximately aligns with the center of the display screen).

Although the detailed structure of the camera holders 42, 42 (particularly the extensible/retractable structure or the flexible structure) is not illustrated in FIG. 17, they can adopt either structure described in Embodiment 1 or Embodiment 4 above. Additionally, the camera holders 42, 42 may be arranged to be pulled out laterally from the left and right sides of the base unit 41 (as indicated by arrows in FIG. 17). This arrangement allows the camera holders 42, 42 to be pulled out laterally in accordance with the lateral width of the display device 91, regardless of the shape (the lateral width, in particular) of the display device 91.

According to the above arrangement, the stationary camera device A5 of Embodiment 5 is capable of generating an image of a user with a forward line of sight by synthesizing images from the two camera units 43, 43 which are positioned on the left and the right. To put it another way, it is possible to send a synthesized image of a user as if the camera units 43, 43 were positioned approximately at the center of the display screen of the display device 91. Since these camera units 43, 43 do not actually overlap the display screen, a user can see the display screen without interference of the camera units 43, thus enjoying a remarkably convenient form of use.

Additionally, the two camera units 43, 43 can be utilized for generation of a three-dimensional image. To give a specific example, using one of the camera units 43 as a camera for the left eye and the other camera unit 43 as a camera for the right eye, a three-dimensional image can be generated by synthesizing respective images.

As described above, the stationary camera device of the present invention is serviceable in two forms of use which can be suitably selected for a user's convenience. In the first form of use, where the base unit rests on the housing of the display device, the camera holder is allowed to hang down in order to position the camera unit at the center of the display screen. In the second form of use, where the base unit rests in front of the display device on the base table, the camera holder is allowed to stand upright in order to position the camera unit at the center of the display device. In addition, the position of the camera unit is finely adjustable, regardless of the shape and screen size of the display device. Thus, the stationary camera device is useful in being capable of positioning the camera unit at the center of the display screen without fail, and also capable of adjusting the distance to a user.

Further, in the arrangement synthesizing images from two camera units which are disposed on the left and the right, the camera units do not overlap the display screen. As a result, a user, who can see the display screen without interference of the camera units, will find it remarkably convenient to use the device. Moreover, this arrangement is useful in being capable of sending a synthesized image as if the camera units were positioned at the center of the screen of the display device.

In another respect, the stationary camera device of the present invention has excellent storage characteristics when not in use. Besides, the camera holder and the camera unit are protected from damage during packaging or the like. Furthermore, the device can be packed compactly for improved transport efficiency.

What is claimed is:

1. A stationary camera device comprising:

a base unit adapted to selectively rest on either a housing of a display device or on a base table holding the display device, said base unit have a left side and a right side;

a plurality of camera holders attached to said base unit on said left and right sides of said base unit; and cameras mounted on extreme ends of said plurality of camera holders;

wherein said base unit is adapted to selectively rest on either the housing of the display device or on the base table of the display device so as to extend along a lateral direction, said lateral direction is defined as a direction that is parallel to a surface of the base table and also parallel to a display screen of said display device, and a direction orthogonal to said lateral direction is a vertical direction;

wherein each of said plurality of camera holders is movable relative to said base unit in at least said vertical direction such that said cameras can be positioned at an optional height along a left side and a right side of a display screen of the display device from a position of said base unit on either of the housing of the display device or on the base table holding the display device; and wherein said camera holders can be extended from and retracted into said base unit in said lateral direction so as to be adjustable to different widths of the display device.

2. A stationary camera device comprising:

a base unit adapted to selectively rest on either a housing of a display device or on a base table holding the display device;

a camera holder attached to said base unit; and a camera mounted on an extreme end of said camera holder;

wherein said base unit is adapted to selectively rest on either the housing of the display device or on the base table of the display device so as to extend along a lateral direction, said lateral direction is defined as a direction that is parallel to a surface of the base table and also parallel to a display screen of said display device, and direction orthogonal to said lateral direction is a vertical direction; and wherein said camera holder is rotationally movable relative to said base unit in at least said vertical direction, said camera is rotationally movable relative to said camera holder in at least said vertical direction, said camera is mounted to said extreme end of said camera holder so that it can be pulled out of said camera holder to be freely positioned such that said camera can be positioned in front of the display device and facing a viewer of the display device from a position of said base unit on either of the housing of the display device or on the base table holding the display device; and wherein said camera has a suction cup at a rear side thereof to be mountable to a surface when pulled out of said camera holder.

3. The stationary camera device of claim 2, wherein said camera holder comprises an extensible and retractable arm to which said camera is mounted.

* * * * *

UNITED STATES PATENT AND TRADEMARK OFFICE
CERTIFICATE OF CORRECTION

PATENT NO. : 6,848,842 B2
DATED : February 1, 2005
INVENTOR(S) : Nozomu Sahashi

It is certified that error appears in the above-identified patent and that said Letters Patent is hereby corrected as shown below:

<u>Title page,</u>
Item [76], Inventor, please change "Nozomu Saruhashi" to -- Nozomu Sahashi --.

Signed and Sealed this

Second Day of August, 2005

JON W. DUDAS
*Director of the United States Patent and Trademark Office*